United States Patent [19]

Butler

[11] Patent Number: 5,651,932

[45] Date of Patent: Jul. 29, 1997

[54] METHOD FOR INVESTMENT WAX CASTING OF GOLF CLUB HEADS

[76] Inventor: Byron Butler, 2 Siega, Rancho Santa Margarita, Calif. 92688

[21] Appl. No.: 422,250

[22] Filed: Apr. 14, 1995

[51] Int. Cl.⁶ .................................................. B29C 33/50
[52] U.S. Cl. .......................... 264/225; 164/45; 249/183; 264/313; 264/318
[58] Field of Search .................................. 264/313, 318, 264/225, 226, 227; 425/DIG. 44; 164/35, 45, 516, 235; 249/183

[56] References Cited

U.S. PATENT DOCUMENTS

| | | | |
|---|---|---|---|
| 2,745,139 | 5/1956 | Burton | 425/DIG. 44 |
| 3,552,480 | 1/1971 | Harris | 249/183 |
| 3,570,585 | 3/1971 | Harris | 249/183 |
| 4,682,643 | 7/1987 | Bernhardt et al. | 164/45 |
| 4,702,870 | 10/1987 | Setterholm et al. | 425/DIG. 44 |
| 5,102,607 | 4/1992 | Hickman et al. | 264/318 |
| 5,204,046 | 4/1993 | Schmidt | 264/334 |

*Primary Examiner*—Jill L. Heitbrink
*Attorney, Agent, or Firm*—Leonard Tachner

[57] ABSTRACT

A method of fabricating a wax casting of a golf club iron head including the steps of providing a wax injection tool having a rear cavity projection; providing a collapsible insert that is shaped to provide a desired undercut peripheral region in the rear cavity of the wax casting; installing the collapsible insert on the periphery of the rear cavity projection of the tool; injecting hot wax into the tool and allowing the wax to harden; then removing the hardened wax and insert from the injection tool; and finally removing the insert as a unitary member from the hardened wax, without requiring any form of breakage of the wax casting or the insert such as by distorting its shape. The aforementioned method is accomplished by providing a unique collapsible insert which is preferably made of a polyurethane, silicone, rubber-like material and which is molded into the peripheral undercut region shape and which material may be cured in a desired shape and configuration which can be temporarily distorted and collapsed for removal from the wax casting, but which remembers its original shape and can therefore be re-used numerous times to make additional wax castings.

3 Claims, 7 Drawing Sheets

METHOD FOR INVESTMENT WAX CASTING OF GOLF CLUB HEADS

BACKGROUND OF THE INVENTION

1. Field of the Invention

The present invention relates generally to the field of golf club head manufacture and more specifically to an improved investment or lost wax casting process and to a collapsible insert that may be used in that process to fabricate a golf club head iron or putter having a peripherally weighted rear cavity with an undercut region along the radial periphery of the cavity.

2. Prior Art

It is well-known in the golf club head art to use an investment lost wax casting process to manufacture such golf club heads. In this process, a wax duplicate of the desired golf club head configuration is first manufactured using a mold tool into which hot wax is injected. The mold tool provides an injection cavity which is shaped precisely congruent to the desired configuration of the golf club iron or putter head. When the wax cools and the molding tool is opened, the wax casting is removed and may be then used as an investment casting, whereby molten metal, such as steel having chemistries normally used in the fabrication of golf club heads, may be poured into a ceramic casing formed around the wax casting which is melted and burned out of the hot ceramic slurry. The metal forms in the casing into the exact same shape as the melted wax casting. Thus, it can be seen that the wax casting must be precisely the same shape and configuration as the desired shape of the ultimate product, namely the metal version of the golf club head iron or putter.

In the manufacture of modern golf club iron heads, it has been recognized that improved performance of the golf club head can be achieved by providing a peripheral weight distribution to minimize the negative impact of off-center hits on the golf ball. To achieve such peripheral weight distribution it has become common to provide a rear cavity surrounded by a peripheral mass. The desire to distribute the peripheral weight as far as possible from the center of gravity of the golf club iron head has resulted in still a further change in the configuration of the golf club head, namely, the use of an undercut region between the peripheral mass and the rear wall of the hitting surface that defines the forward most surface of the rear cavity.

While such an undercut region may improve the performance of the golf club head, it has the disadvantage of increasing the difficulty of fabricating the wax casting because the wax version of the golf club head must also have the rear cavity undercut region in order to result in a head that has that undercut region. It is therefore well-known in the prior art to use a special insert in the wax casting mold tool to define and maintain an undercut region while the molten wax is injected into the tool. A difficulty in the fabrication process comes from the need to remove the insert from the wax casting after the wax has been cooled and without damaging the surface of the wax casting which would otherwise negatively impact the aesthetic appearance of the resulting iron head.

One such prior art insert comprises a plurality of undercut insert portions typically made of a metal or ceramic material and which can be readily positioned in the mold tool before the wax is injected. The multi-piece insert then comes out with the wax investment casting and can be readily removed after the wax has cooled by simply removing one piece at a time. If enough pieces are used depending on the extent of the undercut, the removal of the insert pieces can usually be accomplished without disturbing the surface of the wax. Unfortunately, as will be seen hereinafter in more detail, a multi-piece insert requires that the various pieces abutt one another, thus forming butt lines. No matter how perfectly matched the individual pieces are at their respective ends, the butt lines are unavoidable and the butt lines produce corresponding butt line impressions in the wax adjacent the insert, along the peripheral portion of the rear cavity. Such line impressions (flash) thus appear in the wax casting and ultimately appear in the metal head which can detract from the aesthetic appearance of the head. Furthermore, they can result in ceramic inclusion and difficult secondary finishing which is expensive and time-consuming. Consequently, there is a substantial disadvantage to using a multi-piece insert to produce an undercut region along the rear cavity periphery of a wax casting.

Another prior art alternative is to use a single piece insert, but made out of a material which can be readily broken apart and also removed piece by piece from the cooled metal head. By way of example, in the prior art a typical single piece insert for this purpose may be made out of a brittle material, such as a readily breakable ceramic which can be broken out of the cast metal head after it has cooled. Unfortunately, such a brittle insert is expensive and can add considerably to the overall cost of the manufacture of the head. Because each such insert is broken away from the finished head, it can only be used once and thus every head requires the investment of one brittle insert, a very expensive procedure. Furthermore, there is the possibility that the brittle inserts will not be consistent in size.

Still another prior art insert technique for generating undercut regions in golf club heads, involves the use of soluable wax which must be dissolved using a solution such as citric acid solution which also adds to the time and expense of fabrication.

The applicant herein has conducted a novelty search of the prior art, the results of which are as follows:

U.S. Pat. No. 4,929,403 to Audsley is directed to the composition of and the process for forming flexible molds used in casting finely detailed objects. While the reference focuses on the radiatively curing procedure and the elaborate combination of materials that go into the fabricating process, the end result is an elastic, flexible mold for use in casting reproductions of the finely detailed object that will ultimately be produced. Among the various reproduction types to be cast from the mold is a wax reproduction for use in the lost wax process.

U.S. Pat. No. 4,682,643 to Bernhardt et al is directed to an investment casting process which in one embodiment employs a reusable, resilient pattern to form molds having a multi-cavity structure. In that embodiment, the pattern is formed by curing in the desired shape a quantity of flowable silastic rubber. Molds may then be shaped by casting around this pattern a quantity of various mold materials. After the mold so shaped has cured, the deformable rubber pattern is mechanically removed for reuse in forming another mold.

U.S. Pat. No. 4,027,723 to Maurino et al is directed to an apparatus for producing female molds for use in the casting of brake drums. As shown in FIGS. 3 and 4, the inner cavity of the female mold 26 is formed by use of a flexible male mold 1 having a plurality of projections 5 extending radially outward to form corresponding projections in the female mold 26 that extend radially inward. The elastomeric properties of the male mold 1 facilitate the formation of such projections on the female mold 26 by allowing the male mold 1 to collapse radially inward when a vacuum is drawn around it. The collapse of the mold 1 causes its projections 5 to be withdrawn from the corresponding cavities (between the projections created) formed in the female mold 26 so that the male mold 1 may be removed from the female mold cavity without damage to the radial projections formed therein.

U.S. Pat. No. 4,378,044 to Suchan is directed to a pattern for use in casting molds of cast pieces having at least one undercut. As the undercut is intended to be formed here by the application of pressure during final compacting of the mold material, pattern 1 (FIG. 1), comprises a rigid portion 2 and a deformable rubber top portion 3. The rubber top portion 3 is shaped such that, under stress, it deforms into the shape outlined by the broken line 5 to form a bulge 6 for creating the undercut in the mold being cast. The inventor here states that the unstressed shape of the rubber top portion 3 and the hardness of the rubber forming that portion may be varied to obtain desired casting results.

U.S. Pat. No. 4,472,092 to Schmidt is directed to the fabrication of a golf club head having a metallic shell construction. The process here does not necessarily employ a reusable core for casting a mold; however, the process does incorporate the lost wax procedure to ultimately form a metallic golf club head having an internal cavity. Although the process calls for the core 10 of FIG. 1 to be chemically dissolved after the wax shell 15 is formed, the inventors state that various materials including styrofoam and other synthetic resins may be employed for the core.

Other patent references, namely, U.S. Pat. No. 3,396,934 to Ferris; U.S. Pat. No. 4,499,940 to Hall; U.S. Pat. No. 5,066,213 to Ferincz; U.S. Pat. No. 5,247,984 to Stanciu; and U.S. Pat. No. RE 34,862 to Czor are all directed to other systems of even less relevance to the present invention.

Unfortunately, none of the aforementioned prior art patents discloses any means for overcoming the disadvantages of the previously described prior art and thus there remains a need for providing an improved investment wax casting process for golf club heads having an undercut region adjacent the rear cavity peripheral mass of the golf club head.

SUMMARY OF THE INVENTION

The present invention solves the aforementioned need by providing an improved investment wax casting process and apparatus therefor which overcomes the noted disadvantages of the prior art. The key element in the improved method and apparatus of the present invention is a collapsible insert which is provided as a unitary member, thus overcoming the aforementioned disadvantages of a multi-piece insert. The collapsible insert may be removed from the cooled wax casting without any form of breakage because the insert of the present invention is made of a flexible, deformable material such as polyurethane, silicone or other rubber-like material.

In a preferred embodiment of the invention disclosed herein, the collapsible insert is provided in a shape which is relatively identical to that of the prior art brittle, rigid or soluable wax inserts previously described. However, unlike the prior art inserts, the insert of the present invention is made of a flexible, resilient material, such as polyurethane, silicone or rubber. When cured, such as in a mold having the desired insert shape, the inventive insert tends to remember its shape, even after being collapsed for removal from the wax casting as will be described hereinafter.

The collapsibility of the insert of the present invention, resulting from the flexible, resilient nature of the material of which it is made, permits the insert to be removed from the wax casting undercut region around the periphery of the rear cavity, in one piece by simply pulling and collapsing the insert while withdrawing it from the wax casting. This may be readily accomplished without producing any butt lines or butt line impressions and thus without affecting the aesthetic appearance of the wax casting and the eventual metal iron head which is made from the wax casting. Furthermore, the insert of the present invention, because of its inherent memory characteristics, can be re-used many times because the preferred materials of polyurethane, silicone or rubber are also very resistant materials.

The surface of the insert of the present invention can be squeezed and flexed and collapsed to be removed from the wax investment casting without any impact on that surface, which might otherwise prevent the re-use of the insert. Thus, unlike the aforementioned brittle ceramic insert which must be broken into pieces and thus used only once for each head, the collapsible insert of the present invention may be used many times to create many heads, thus significantly reducing the cost impact of the insert on the manufacture of each golf club head. Furthermore, the insert of the present invention may be readily removed by mechanical action as opposed to time-consuming chemical action or soluable wax or the like.

OBJECTS OF THE INVENTION

It is therefore a principal object of the present invention to provide an improved apparatus and method for manufacturing golf club heads having rear cavities with an undercut periphery.

It is an additional object of the present invention to provide a collapsible insert for use in an investment or lost wax casting process for the manufacture of golf club iron heads having a rear cavity with an undercut peripheral region.

It is an additional object of the present invention to provide a collapsible insert for use in the fabrication of a wax casting of a golf club head having an undercut rear cavity, wherein the insert may be readily removed from the cooled wax casting as a unitary member and without requiring breakage of the insert.

It is still an additional object of the present invention to provide a flexible, resilient insert for use in the manufacture of wax castings of golf club heads having a rear cavity with an undercut periphery, wherein the insert is provided as a single piece to avoid leaving butt line impressions in the wax casting and wherein the insert may be removed from the wax casting without damage so that it may be re-used numerous times to manufacture additional wax castings.

BRIEF DESCRIPTION OF THE DRAWINGS

The aforementioned objects and advantages of the present invention as well as additional objects and advantages thereof will be more fully understood hereinafter as a result of a detailed description of a preferred embodiment of the invention when taken in conjunction with the following figures in which.

DETAILED DESCRIPTION OF A PREFERRED EMBODIMENT

Figure 1:
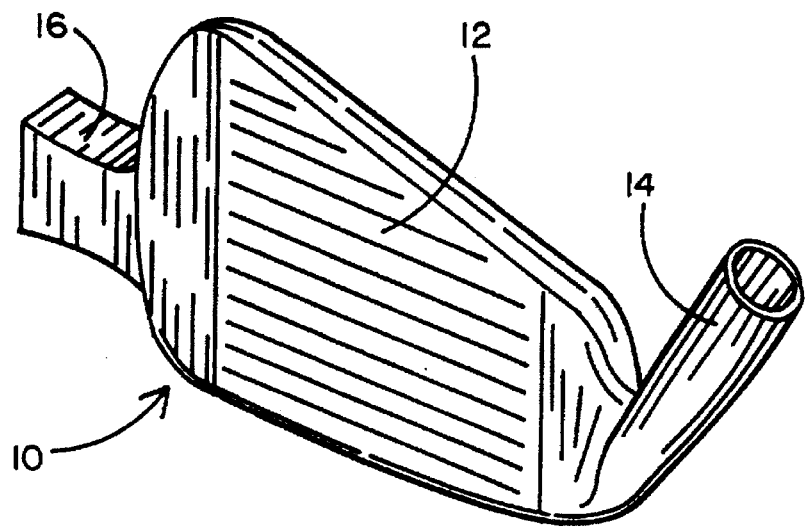
FIG. 1 is a front isometric view of a wax casting of a golf club iron head of the type in which the present invention may be readily utilized.
Figure 2:
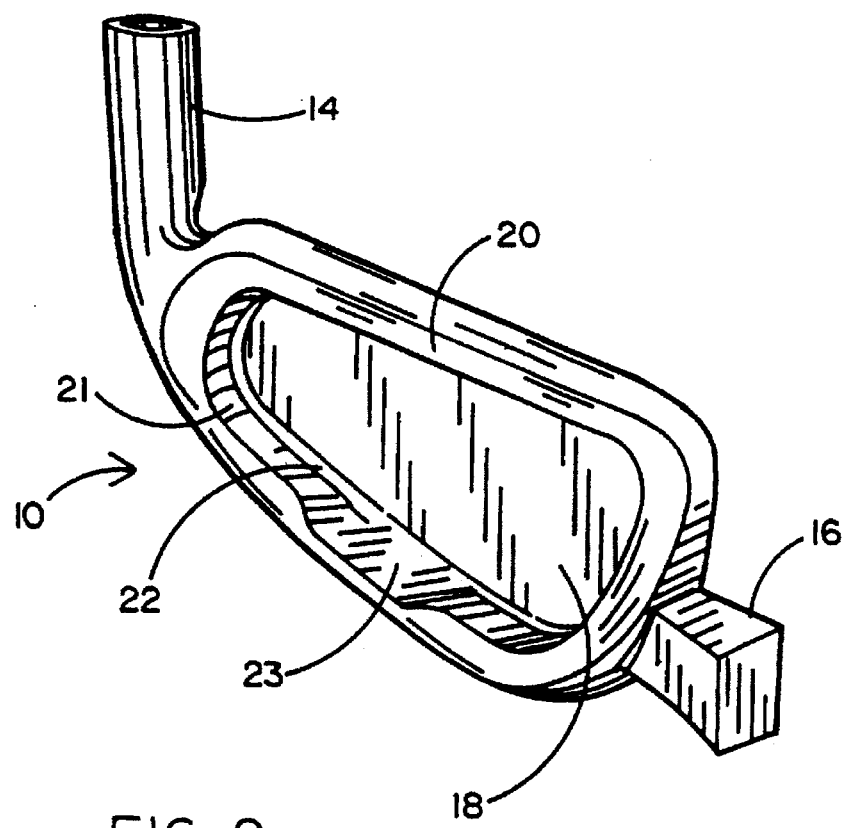
FIG. 2 is a rear isometric view of the wax casting of FIG. 1, showing the rear cavity portion thereof which has an undercut peripheral region.

Referring now to the accompanying figures, it will be seen that a wax casting 10 is substantially a duplicate of a golf club head manufactured from the wax casting in a conventional manner. More specifically, the wax casting 10 comprises a scored face 12, a hosel 14 and a dipping tree handle 16, the latter of which is designed for manufacturing purposes only and is not a component or element of the completed golf club head. As seen further in the accompanying figures and particularly in FIG. 2, the wax casting 10 also comprises a rear cavity 18, having a periphery 20, including a peripheral mass 21 with an undercut region 22. In the particular embodiment shown herein, the peripheral mass also provides a flat 23. However, it will be understood that the particular detailed characteristics of the peripheral mass of a golf club head with which the present invention can be advantageously used, are not limiting of the invention and that the invention is designed to be used with any peripheral weighted golf club head having an undercut region in the periphery of the rear cavity. Suffice it to say that the wax casting configuration shown in FIGS. 1 and 2 is an illustrative example of a typical golf club iron head wax casting with which the present invention may be used to provide an improved apparatus and method for generating an undercut region adjacent the peripheral mass of a rear cavity of such a head.

Figure 3:
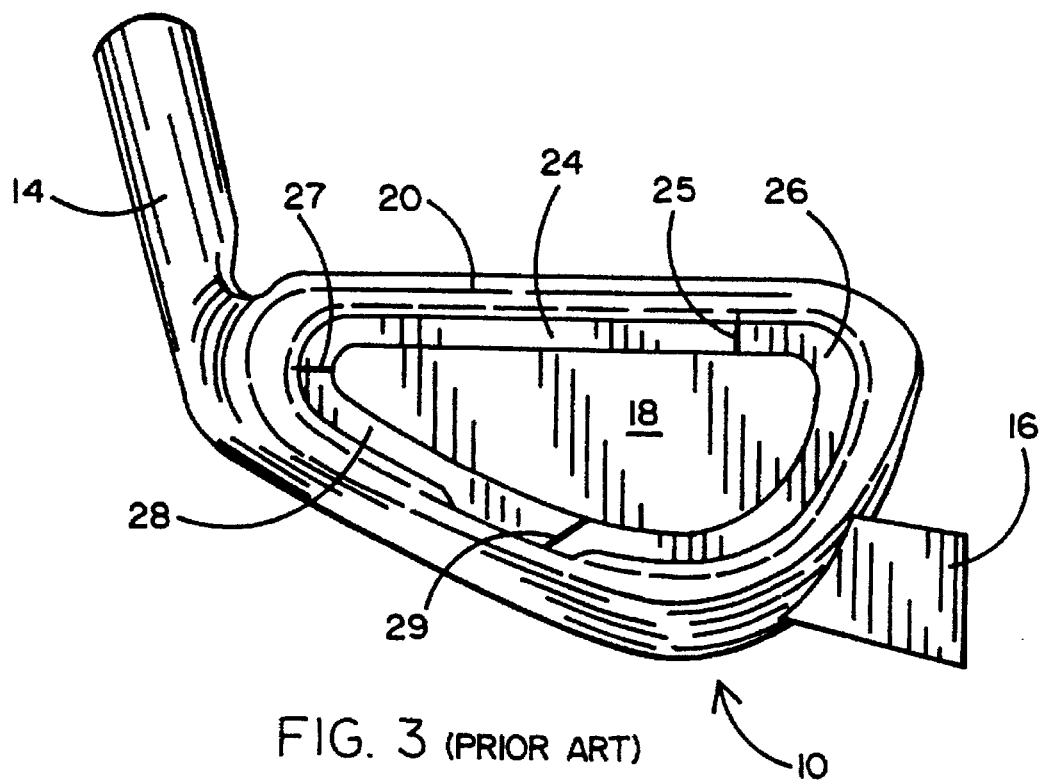
FIG. 3 is a rear elevational view of a golf club iron head wax casting showing the use of a prior art multi-piece undercut insert.
Figure 4:
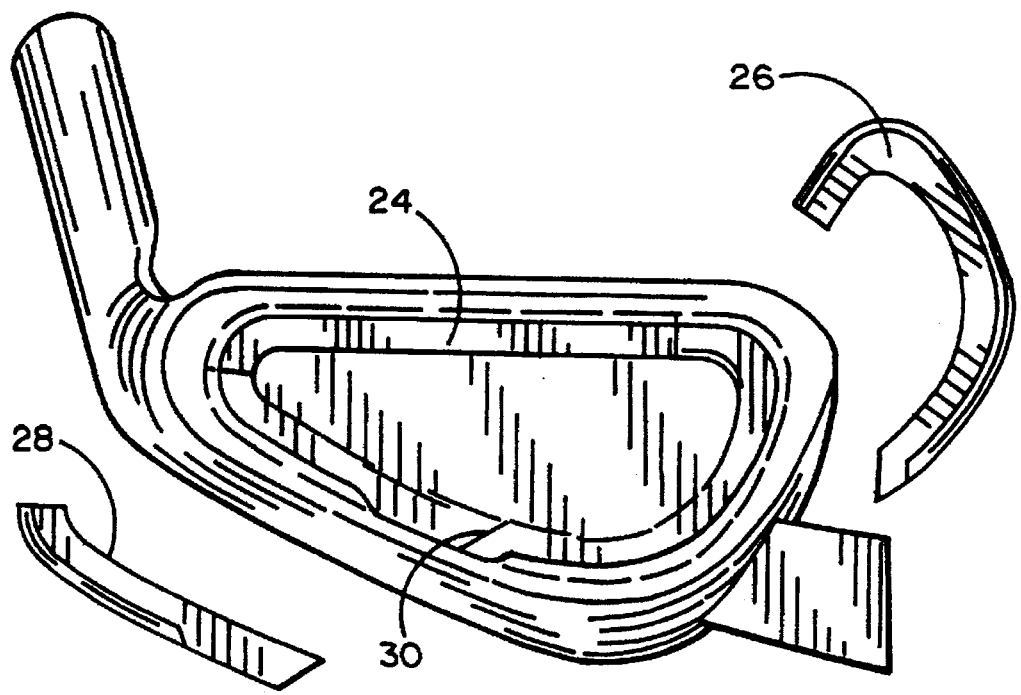
FIG. 4 is a view of the wax casting, similar to that of FIG. 3, but showing two of the insert pieces, removed from the wax casting.

Referring to FIGS. 3 and 4, it will be seen that one method of generating the undercut 22 of the wax casting 10 is to employ a plurality of undercut insert portions, such as undercut insert portions 24, 26 and 28, shown in FIG. 3. This prior art technique relies on the fact that it is possible to remove an undercut insert comprising several abutting portions, simply by removing one portion at a time as shown in FIG. 4. Unfortunately, such a multiple portion undercut insert results in a plurality of butt lines, such as butt lines 25, 27 and 29 shown in FIG. 3. As previously described, the butt lines that exist between the various insert portions shown in FIG. 3, leave a butt line impression, such as butt line impression 30 in the wax casting 10. Such an impression of the wax casting will be transferred to the golf club iron head, just as the score lines 12 for example will be transferred from the wax casting to the iron head. Thus the iron head will be affected aesthetically by the inclusion of the butt line impressions from the wax casting 10. Such butt line impressions also create ceramic inclusion and secondary finishing problems which reduce yield and increase costs. Thus, this prior art technique for providing an undercut in the wax casting 10 suffers from significant disadvantages.

Figure 5:
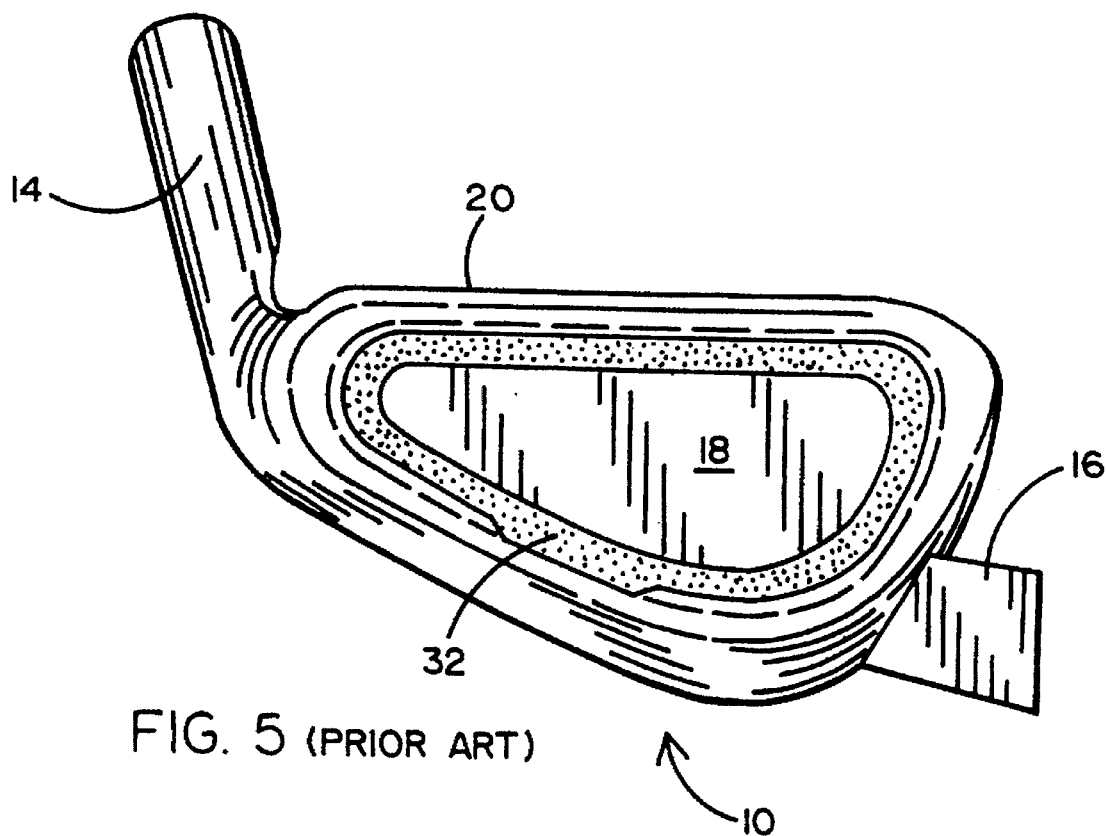
FIG. 5 is a rear elevational view of the wax casting of a golf club iron head showing the use of a prior art brittle insert.
Figure 6:
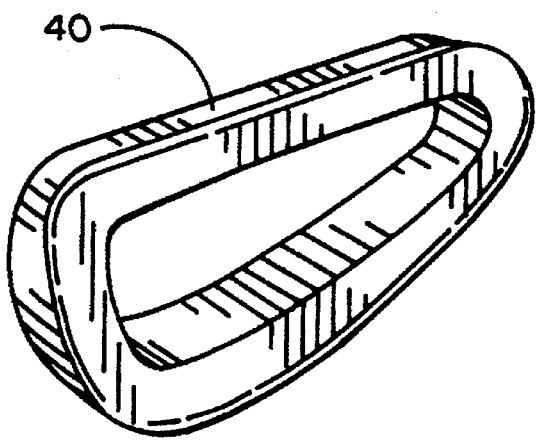
FIG. 6 is a front three-dimensional view of the collapsible insert of the present invention shown in a preferred configuration.
Figure 7:
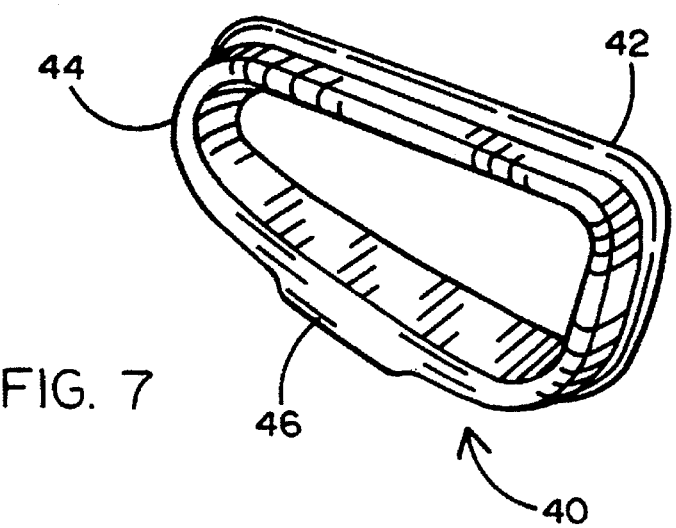
FIG. 7 is a rear three-dimensional view of the collapsible insert of the present invention.
Figure 8:
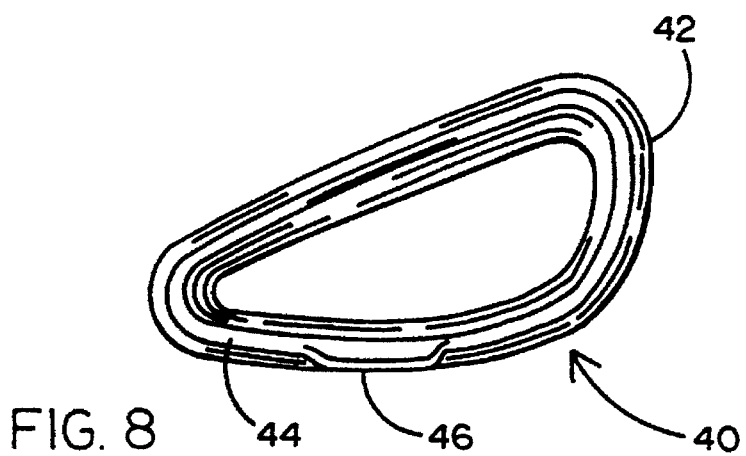
FIG. 8 is a rear elevational view of the collapsible insert of the present invention.
Figure 9:
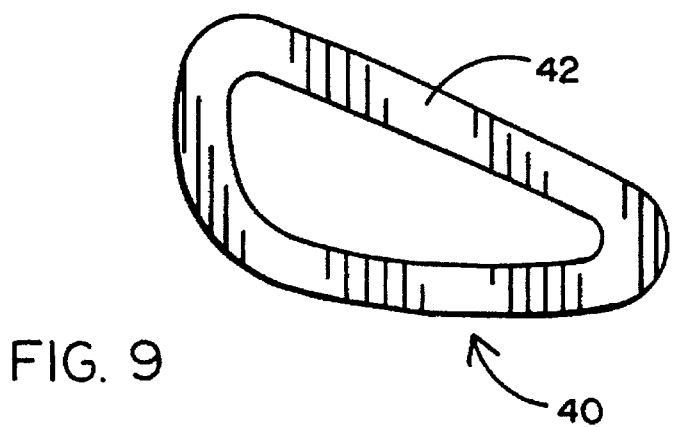
FIG. 9 is a front elevational view of the collapsible insert of the present invention.

Still another prior art technique for producing a undercut region in wax casting 10 may be better understood by referring now to FIG. 5 from which it will be seen that a rigid insert 32, having a unitary structure, may be substituted for the various insert portions of FIGS. 3 and 4. Rigid insert 32 is preferably made of a brittle material, such as a ceramic material which may be readily broken, so that the pieces may be easily removed from the metal head after it has cooled, leaving the undercut region intact and avoiding the butt line impression problem of the multi-portion insert. However, as previously indicated, the use of a dedicated rigid insert 32 in the fabrication of each and every club head is an expensive proposition. For example, it is anticipated that a rigid insert 32 can add as much as a dollar to cost of manufacturing each golf club iron head, which in a typical golf club iron can represent anywhere from, for example, 5% to 15% of the cost of manufacture. Consequently, this prior art technique for providing an undercut region in a golf club iron head is also not a satisfactory solution.

The solution provided by the present invention comprises a collapsible insert 40, shown in FIG. 6 through 9. Collapsible unit 40 comprises an undercut region 42, a peripheral region 44 and a flat region 46 in the embodiment shown, which is specifically designed to provide the wax casting 10 in the desired configuration shown in FIGS. 1 and 2. However, it will be understood that the shape of the collapsible insert 40 is entirely dependent upon the peripheral mass shape and rear cavity shape of the golf club iron head for which the insert is used in making the corresponding wax casting. Thus, it will be understood that the configuration of the collapsible insert 40, shown in the accompanying figures, is by way of illustration only and is not limiting of the invention.

A key characteristic of the collapsible insert 40 is primarily the unique structural aspect of the insert, resulting from the material from which it is made. More specifically, in the preferred embodiment of the invention disclosed herein, the insert 40 is made of either polyurethane, silicone, or rubber-like material. These materials are particularly useful in the present invention because each may be cured in a separate mold to the shape needed to accommodate the undercut region of the selected wax casting. In addition, each such material is highly resistant to surface damage and is flexible and resilient enough to be collapsed and pulled out of a wax casting, without detrimentally effecting the wax casting surface. Furthermore, each such material, after being cured in a mold into the shape desired, has an inherent memory characteristic which allows it to retain that shape, even after being collapsed to be removed from a wax casting. Thus the insert 40 is re-useable a large number of times, so that numerous wax castings can be made from it, thus permitting the amortization of the cost of the insert over a large number of golf club iron heads.

Figure 10:
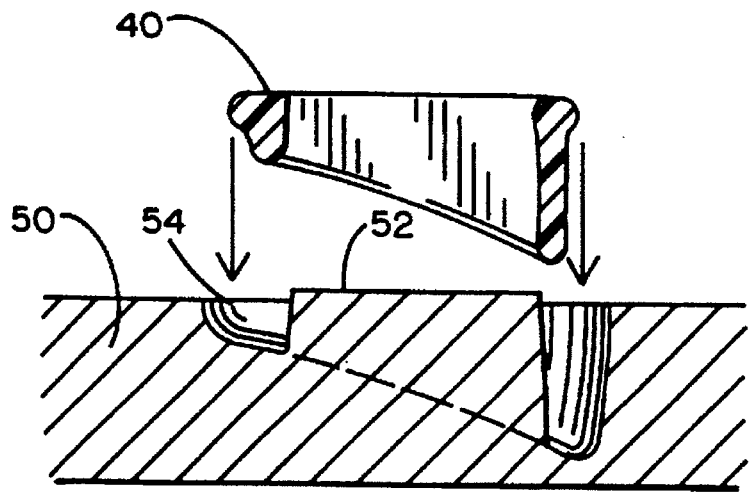
FIGS. 10, 11, 12, 13, 14, 15 and 16 are a sequence of drawings, illustrating the method of fabricating an investment wax casting for a golf club iron head using the collapsible insert of the present invention.
Figure 11:
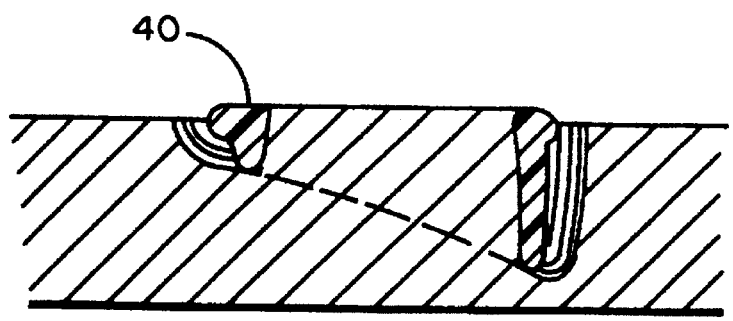
Figure 12:
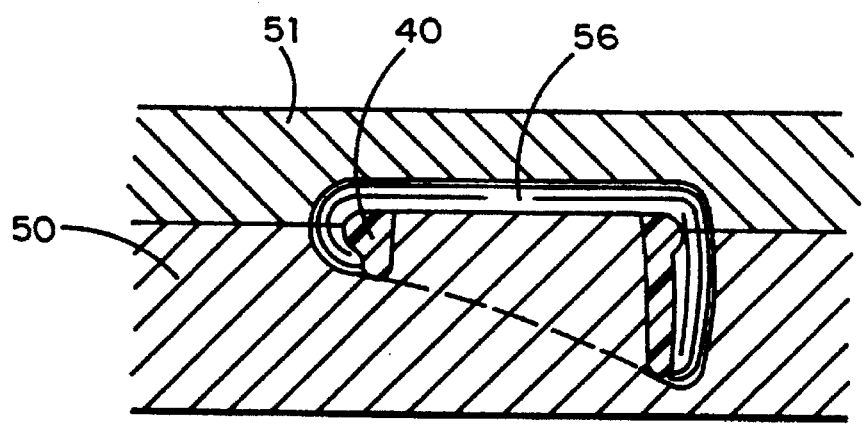
Figure 13:
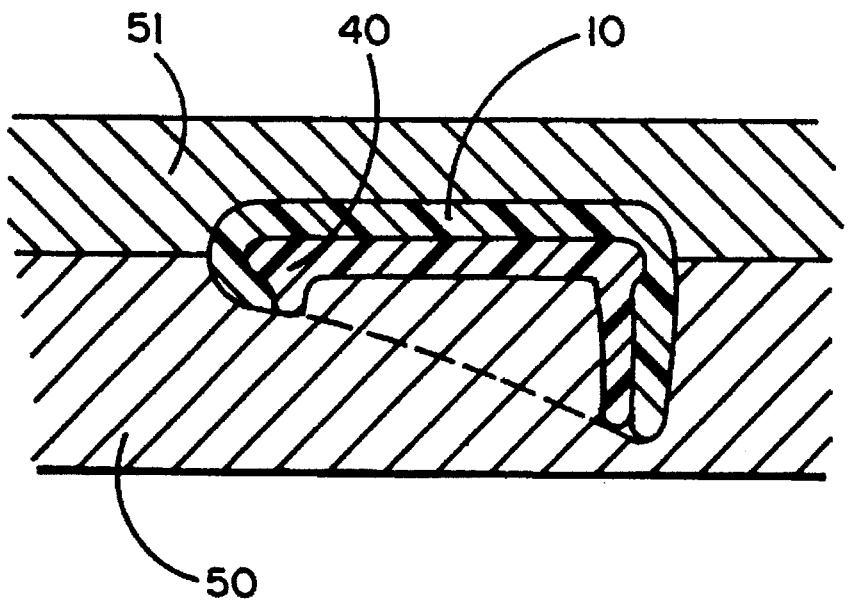
Figure 14:
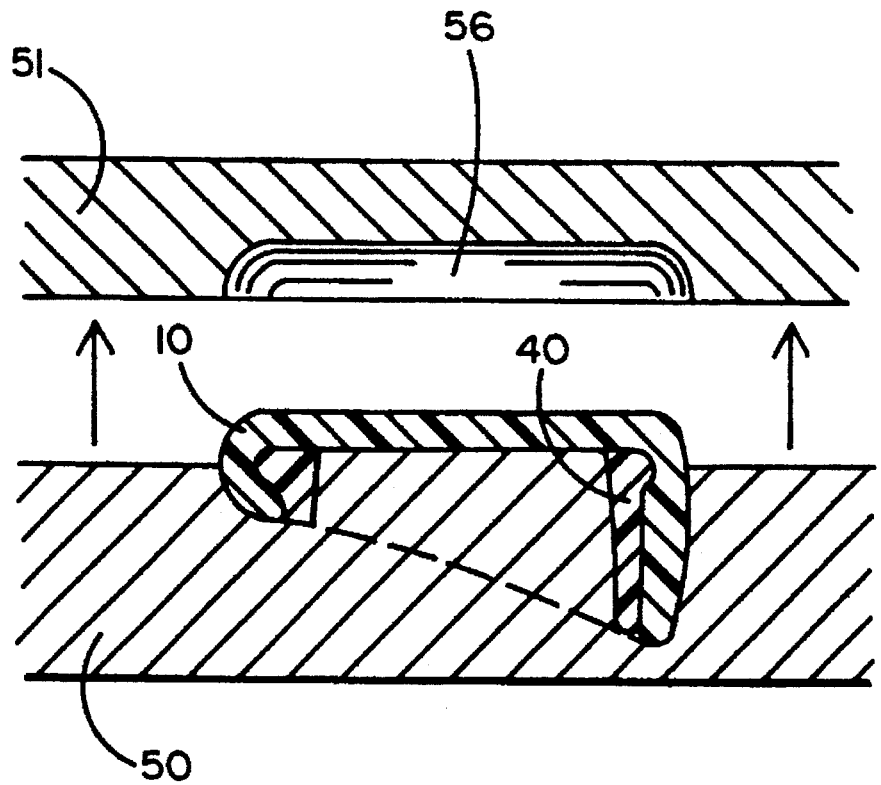
Figure 15:
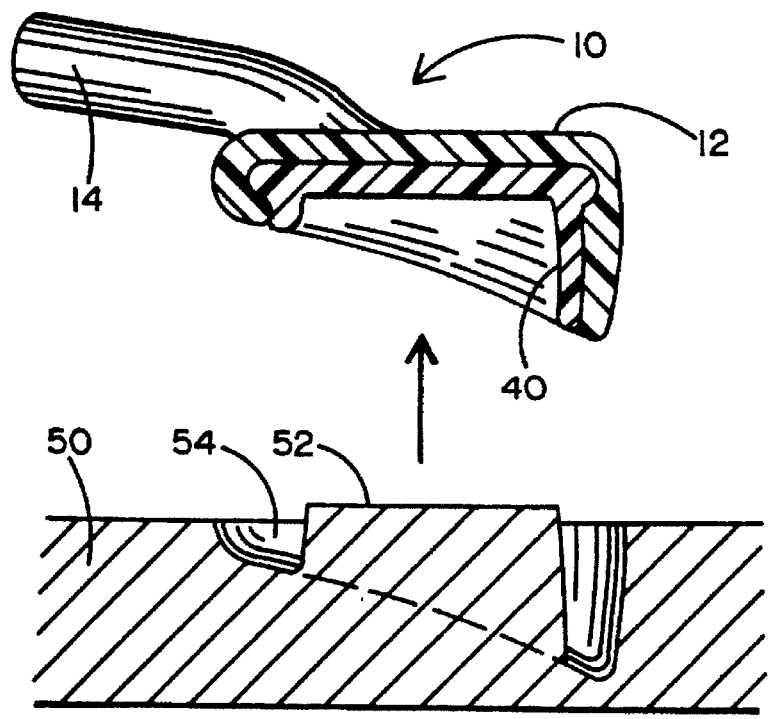
Figure 16:
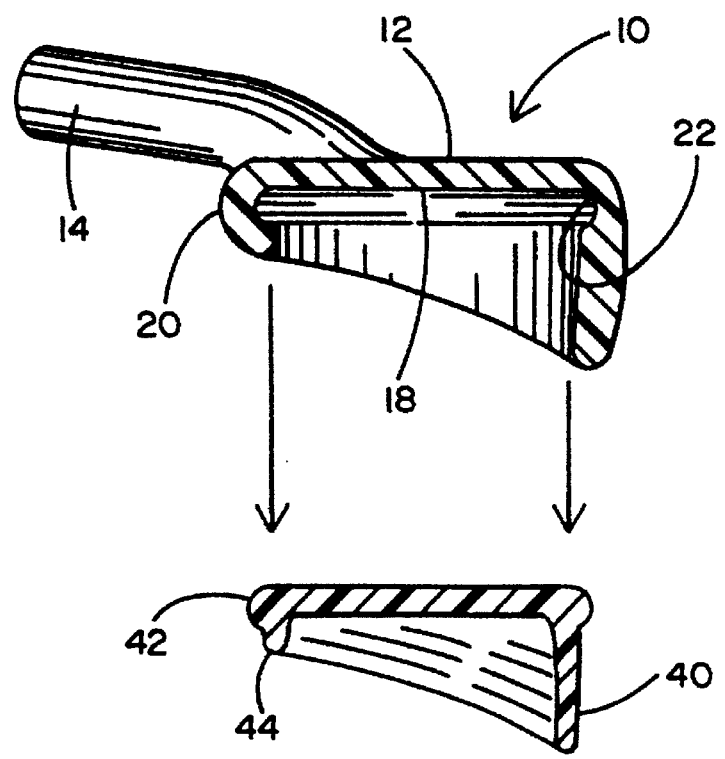

The manner in which the flexible, collapsible insert 40 of the present invention is used in a method of manufacturing a wax casting, can be better understood by referring now to FIGS. 10 through 16. Referring to those figures, it will be seen that a wax injection tool, comprising a lower tool 50 and an upper tool 51, provides a cavity projection 52 around which there is a lower injection cavity 54. A corresponding upper injection cavity 56 is provided in the upper tool 51. As seen in FIG. 10, the collapsible insert 40 is placed around the cavity projection 52 in the lower tool 50 to provide the configuration shown in FIG. 11. Then the upper tool 51 is placed onto the lower tool 50 in a conventional manner as shown in FIG. 12. Wax is then injected into the space between the lower tool 50 and upper tool 51 in a conventional manner, producing the wax casting 10 shown in FIG. 13. Then the upper tool 51 is withdrawn from the lower tool 50 as shown in FIG. 14 and the combination of wax casting 10 and collapsible insert 40 is withdrawn from the lower tool as shown in FIG. 15. The final step in the process of the present invention comprises the removal of the collapsible insert 40 from the wax casting 10 in the manner shown in FIG. 16.

Thus, it will be seen that the method of fabricating a wax casting of a golf club iron or putter head in accordance with the present invention, comprises the steps of providing a wax injection tool having a rear cavity projection; providing a collapsible insert that is shaped to provide a desired undercut peripheral region in the rear cavity of the wax casting; installing the collapsible insert on the periphery of the rear cavity projection of the tool, injecting hot wax into the tool and allowing the wax to harden; then removing the hardened wax and insert from the injection tool; and finally removing the insert as a unitary member from the hardened wax, without requiring any form of breakage of the insert such as by distorting its shape. The aforementioned method is accomplished in the present invention by providing a unique collapsible insert which is preferably made of a polyurethane, silicone or rubber-like material. This insert is molded into the peripheral undercut region shape and is made of a material which may be cured in a desired shape and configuration which can be temporarily distorted and collapsed for removal from the wax casting, but which remembers its original shape and can therefore be re-used numerous times to make additional wax castings.

Those having skill in the art to which the present invention pertains, will now as a result of the applicant's teaching herein, perceive various modifications and additions which may be made to the invention. By way of example, the specific shape and configuration of the collapsible insert disclosed herein is by way of illustration only and may be readily modified to accommodate other shapes of peripheral undercut regions in a golf club head. Furthermore, even though the illustrated embodiment shows the use of an annulus type insert, it will be understood that the collapsible aspect of the material used in the insert of the present invention does not require the use of an annulus and instead may be readily utilized with a relatively solid insert configuration which has no central aperture unlike the embodiment disclosed herein in detail. Accordingly, all such modifications and additions which may be made to the invention are deemed to be within the scope of the claims appended hereto and their equivalents.

I claim:

1. A method of fabricating a wax casting of a golf club head having a rear cavity with an undercut peripheral region; the method comprising the steps of:

a) providing a wax injection tool having a rear cavity projection;

b) providing a collapsible insert having a shape conforming to said undercut peripheral region;

c) installing the collapsible insert on the periphery of the rear cavity projection of said wax injection tool;

d) injecting hot wax into said wax injection tool;

e) allowing the wax to harden;

f) removing the hardened wax and insert from the wax injection tool; and g) removing the insert as a unitary member from the hardened wax.

2. The method recited in claim 1 wherein step g) comprises the step of distorting said insert to remove it from said hardened wax.

3. The method recited in claim 1 wherein step b) comprises the step of molding an insert made of a flexible material into a shape conforming at least in part to said undercut peripheral region of said rear cavity.

* * * * *